US012594444B2

(12) United States Patent
Haram

(10) Patent No.: US 12,594,444 B2
(45) Date of Patent: Apr. 7, 2026

(54) MOBILE FIRE-FIGHTING ASSEMBLY

(71) Applicant: VEST AERO TECH AS, Kristiansund N (NO)

(72) Inventor: Jacob Furnes Haram, Kristiansund N (NO)

(73) Assignee: VEST AERO TECH AS, Kristiansund N (NO)

( * ) Notice: Subject to any disclaimer, the term of this patent is extended or adjusted under 35 U.S.C. 154(b) by 270 days.

(21) Appl. No.: 18/194,083

(22) Filed: Mar. 31, 2023

(65) Prior Publication Data

US 2024/0307718 A1 Sep. 19, 2024

(30) Foreign Application Priority Data

Mar. 16, 2023 (NO) .................................... 20230290

(51) Int. Cl.

| | |
|---|---|
| ***A62C 3/02*** | (2006.01) |
| ***A62C 33/04*** | (2006.01) |
| ***B65H 75/44*** | (2006.01) |

(52) U.S. Cl.

CPC ............ *A62C 3/0228* (2013.01); *A62C 33/04* (2013.01); *B65H 75/4486* (2013.01); *B65H 2701/33* (2013.01)

(58) Field of Classification Search

CPC ... A62C 3/0228; A62C 3/0242; A62C 3/0235; A62C 33/04; B65H 75/4486; B65H 2701/33; B64D 1/18

See application file for complete search history.

(56) References Cited

U.S. PATENT DOCUMENTS

| | | | | |
|---|---|---|---|---|
| 3,220,482 A * | 11/1965 | Eveleth | ................ | A62C 3/0242 222/626 |
| 10,245,455 B2 * | 4/2019 | Mullins | .................. | G09B 19/24 |
| 2006/0270826 A1 * | 11/2006 | Yamaguchi | ........ | C08G 73/1042 528/353 |
| 2013/0146700 A1 | 6/2013 | Wigard | | |
| 2022/0152437 A1 * | 5/2022 | Cannas | .................. | A62C 33/04 |

* cited by examiner

*Primary Examiner* — Christopher R Dandridge

(74) *Attorney, Agent, or Firm* — Alix, Yale & Ristas, LLP

(57) ABSTRACT

Mobile fire-fighting assembly suitable for movement with an aircraft, wherein the mobile fire-fighting assembly comprises a fire extinguisher unit and water supply unit detachably arranged to each other by means of a suitable connection assembly enabling movement of the fire extinguisher unit and water supply unit together as one unit and separately.

20 Claims, 6 Drawing Sheets

MOBILE FIRE-FIGHTING ASSEMBLY

BACKGROUND

The inventive embodiments disclosed herein are related to a mobile fire-fighting assembly, and especially related to a mobile fire-fighting assembly suitable for movement with an aircraft.

Over the last years there has been an increasing number of registered wildfires throughout many parts of the world. With wildfires follows extensive damages to property and human and animal life, as well as results in negative ecological effects.

Fighting of a wildfire is very costly especially due to the large requirements for personnel, fire-fighting equipment and the operational costs of fire-suppressing aircrafts.

Another fact is that wildfires usually occur in remote locations that are difficult to access. The most common fire suppression technique is to use a ground crew of fire-fighters laying out hose lines from a nearby water source, such as a lake, river, well, pond, to the burning area. Such lines are typically only of 20-30 meters lengths to enable the individual firefighter to handle the weight of them. If the fire location is far away from the water source, the time required for laying out and interconnecting several hundred meters of hose or even kilometres, is significant and personnel-demanding. In addition, the terrain for the hose line may be difficult for the personnel to move in and also exposing the firefighters to danger when crossing such as rocks, marshes etc. Accordingly, the manual hose laying operations will often suffer from being a difficult and timely process that is physically demanding on the firefighters.

In US20130146700 A1 is disclosed an aerial reel that can be suspended from a helicopter for laying out and picking up a flexible length of material, such as a fire hose, which attempts to addresses the above-mentioned problem of deploying hoses. The aerial reel includes a rotatable spool for winding and unwinding the hose around, a pick-up member attached to the spool for automatically or manually connecting to the fire hose, an actuatable drive system engaged with the spool for rotating the spool in either direction, and a frame with an attachment system for connecting the spool to the helicopter. The aerial reel is controlled by the helicopter pilot through the cockpit controls, and does not require the use of a person on the ground when laying out and picking up the fire hose.

Other well-known aerial solutions are solutions where the aircraft collects water in a container and drops the water on the wildfire from a distance in the air.

The use of aerial solutions is not without danger. Wind and other weather phenomena caused by the wildfires often expose the aircraft used to danger. This often results in that the aircraft is grounded and not available during the fire suppressing operation. Strong winds, turbulence, smoke, darkness, visibility issues, temperature, humidity, etc. are examples of weather factors that may ground an aircraft. The topic is discussed e.g., in https://verticalmag.com/features/wildfire-weather/.

There is accordingly a need for a mobile fire-fighting assembly enabling fighting of wildfires by utilizing aircrafts for deployment and retrieval.

There is further a need for a mobile fire-fighting assembly enabling fighting of wildfires by providing a constant water flow to a fire from a combination of aerial support and ground equipment.

There is further a need for a mobile fire-fighting assembly reducing the risk for and the need of personnel at the fire-fighting location.

SUMMARY

Provided herein is a mobile fire-fighting assembly partly or entirely solving the drawbacks of the prior art solutions.

Also provided herein is a mobile fire-fighting assembly for fire-fighting of wildfires enabling the use an aircraft to reduce the need for manual operations and personnel.

Also provided herein is a mobile fire-fighting assembly reducing the risk of the aircraft being grounded during a fire suppression operation.

Also provided herein is a mobile fire-fighting assembly enabling fire-fighting of wildfires by providing a constant water flow to a fire from a combination of aerial support and ground equipment.

Also provided herein is a mobile fire-fighting assembly enabling deployment and retrieval by the use of an aircraft, such as helicopters, drones, electric vertical take-off and landing (eVTOL) machines and power lift machines, which is able to do hover flights.

Also provided herein is a mobile fire-fighting assembly enabling fire-fighting of wildfires without requiring additional means, equipment or accessories on ground.

Also provided herein is a mobile fire-fighting assembly that is safe and effective, compared to prior art solutions.

Also provided herein is a mobile fire-fighting assembly that is manually or in an automated manner remotely operated and thus not expose fire-fighting personnel to unnecessary risk.

Further objects will appear from the following description, claims and attached drawings.

The disclosure provides a mobile fire-fighting assembly suitable for movement with an aircraft, especially suitable for wildfires, but is also applicable for other applications requiring water supply. The mobile fire-fighting assembly (MFAA) comprises a fire extinguisher unit and water supply unit.

In some embodiments, the fire extinguisher unit comprises a support structure, at least one motorized hose reel accommodating a hose and a controllable nozzle unit arranged to a first end of the hose. The mentioned hose may be a hose line assembled by several hoses by appropriate connections.

The water supply unit comprises at least one water pump connected to a second end of the hose. The water assembly in an alternative embodiment comprises two more water pumps arranged in series or parallel for achieving the required water flow or pressure, or for redundancy.

The fire extinguisher unit and water supply unit are detachably arranged to each other by means of a suitable connection assembly enabling movement of the fire extinguisher unit and water supply unit together as one unit and separately, especially the fire extinguisher unit.

In accordance with one embodiment of the MFFA, the at least one motorized hose reel is arranged horizontally or vertically rotatable to the support structure and arranged to at least one controllable motor for controlled rotation thereof in connection with reeling in or out the hose.

According to one embodiment of the MFFA, the controllable nozzle unit comprises at least one controllable nozzle arranged to the support structure via at least one controllable orientation unit enabling control of vertical and horizontal position of the at least one nozzle.

In accordance with one embodiment of MFFA, the fire extinguisher unit comprises a control unit provided with a wireless communication device enabling wireless communication with the fire extinguisher unit enabling manual or automated remote control thereof.

According to one embodiment of the MFFA, the fire extinguisher unit is provided with at least one sensor to at least register or measure length of hose that are reeled out from the hose reel or present on the hose reel at any time.

In accordance with one embodiment of the MFFA, the fire extinguisher unit is provided with at least one sensor observing the surroundings to provide feedback about the fire and fire suppression operation.

According to one embodiment of the MFFA, the fire extinguisher unit is provided with legs, wherein at least one of them is adjustable enabling levelling in relation to the ground where the fire extinguisher unit is arranged.

In accordance with one embodiment of the MFFA, the fire extinguisher unit comprises an inertial, motion or level sensor reading the position of the fire extinguisher unit, providing information that may be used to control the adjustable leg(s) for levelling of the fire extinguisher unit.

According to one embodiment of the MFFA, the fire extinguisher unit comprises a lifting assembly enabling an aircraft to move the MFFA as one unit and the fire extinguisher unit as a separate unit. In accordance with one embodiment, the lifting assembly is adapted for connection to a cargo hook system of prior art, enabling automated connection thereto by the aircraft.

In accordance with one embodiment of the MFFA, the fire extinguisher unit comprises a control unit configured, by comprising means and/or software, to control the at least one motor for controlling the motorized hose reel to reel in or out the hose.

According to one embodiment of the MFFA, the water supply unit comprises at least one controllable motor driving the at least one water pump. The at least one motor may be arranged directly to the water pump or via gears. In alternative embodiments, the water supply unit comprises two or more motors for redundancy.

In accordance with one embodiment of the MFFA, the water supply unit further comprises an energy storage and/or fuel tank arranged to the at least one motor enabling the at least one motor to run for a long time period.

According to one embodiment of the MFFA, the water supply unit comprises a housing configured with positive buoyancy to float in water and accommodating the at least one water pump, at least one motor and energy storage and/or fuel tank.

In accordance with one embodiment of the MFFA, the water supply unit is provided with an anti-drifting system configured to maintain the water supply unit in a determined position in a water source.

According to one embodiment of the MFFA, the water supply unit is provided with a control unit provided with a wireless communication device enabling wireless communication with the water supply unit for manual or automated remote control thereof.

The herein disclosed embodiments enable fire-fighting of wildfires by the use of an aircraft reducing the need for manual operations and personnel.

Also provided herein is a mobile fire-fighting assembly reducing the risk of the aircraft being grounded during a fire suppression operation.

By the mobile fire-fighting assembly enables fighting of wildfires by providing a constant water flow to a fire from a combination of aerial support and ground equipment.

The mobile fire-fighting assembly enables deployment and retrieval by the use of an aircraft, such as helicopters, drones, electric vertical take-off and landing (eVTOL) machines and power lift machines, that is able to do hover flights.

By the mobile fire-fighting assembly is enabled fire-fighting of wildfires without requiring additional means, equipment or accessories on ground.

The mobile fire-fighting assembly provides a solution that is safe and effective, compared to prior art solutions.

The mobile fire-fighting assembly further provides a solution that reduces the need for manual interaction by personnel and thus do not expose fire-fighting personnel to unnecessary risk due to the MFFA can be operated remotely or in an automated manner.

BRIEF DESCRIPTION OF THE DRAWINGS

The present invention will below be described in further detail with references to the attached drawings, where.

DETAILED DESCRIPTION

Figure 1:
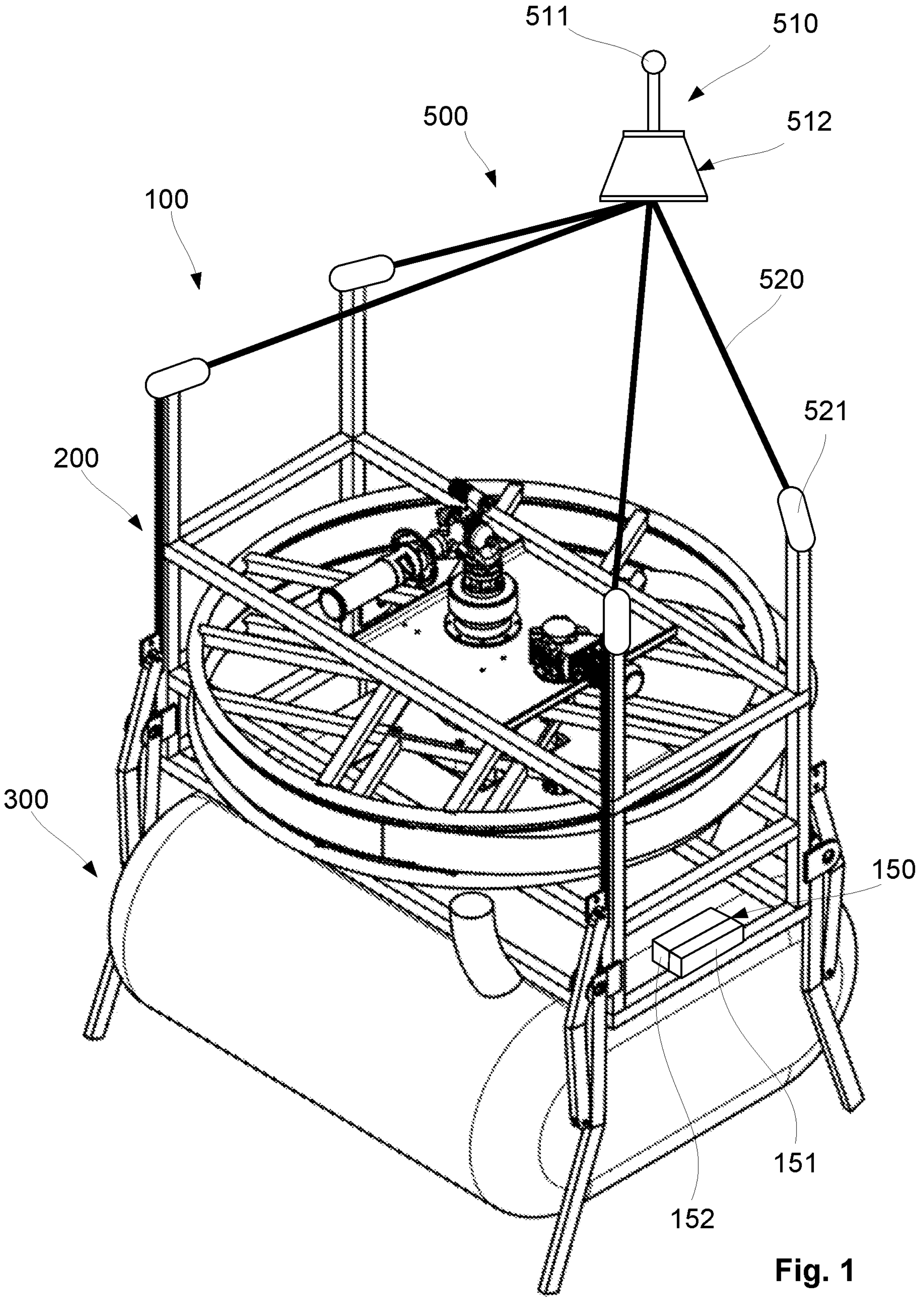
FIG. 1 is a principle drawing of an embodiment of a mobile fire-fighting assembly.

References are now made to FIGS. 1, 2A, 2B, 3A and 3B showing principle drawings of a mobile fire-fighting assembly (MFFA) 100 and features thereof. The MFFA 100 comprises a fire extinguisher unit 200 and water supply unit 300, that are detachably arranged to each other by means of a suitable connection assembly 150, as shown in FIG. 1, enabling movement of the fire extinguisher unit 200 and water supply unit 300 together as one unit and separately, especially the fire extinguisher unit 200.

The fire extinguisher unit 200 comprises a support structure 210, which in the shown embodiment exhibits a rectangular structure. The support structure 210 may be provided with one or more fixed or adjustable legs 211. In the shown embodiment, the support structure 210 is provided with adjustable legs 211 in each corner thereof, extending downwards.

Figure 2A:
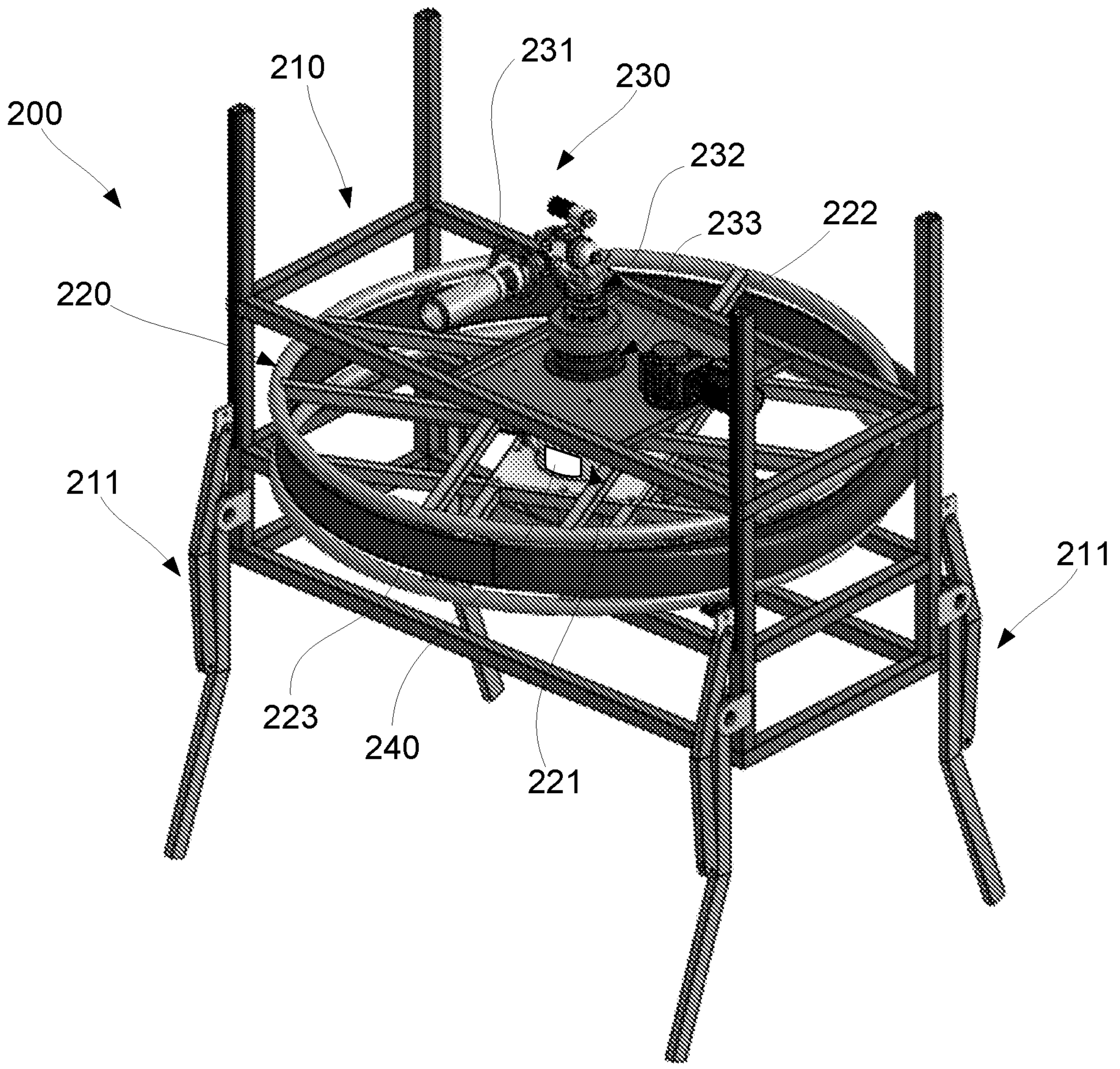
FIGS. 2A-2C are principal drawings of embodiments of a fire extinguisher unit of the mobile fire-fighting assembly.
Figure 2B:
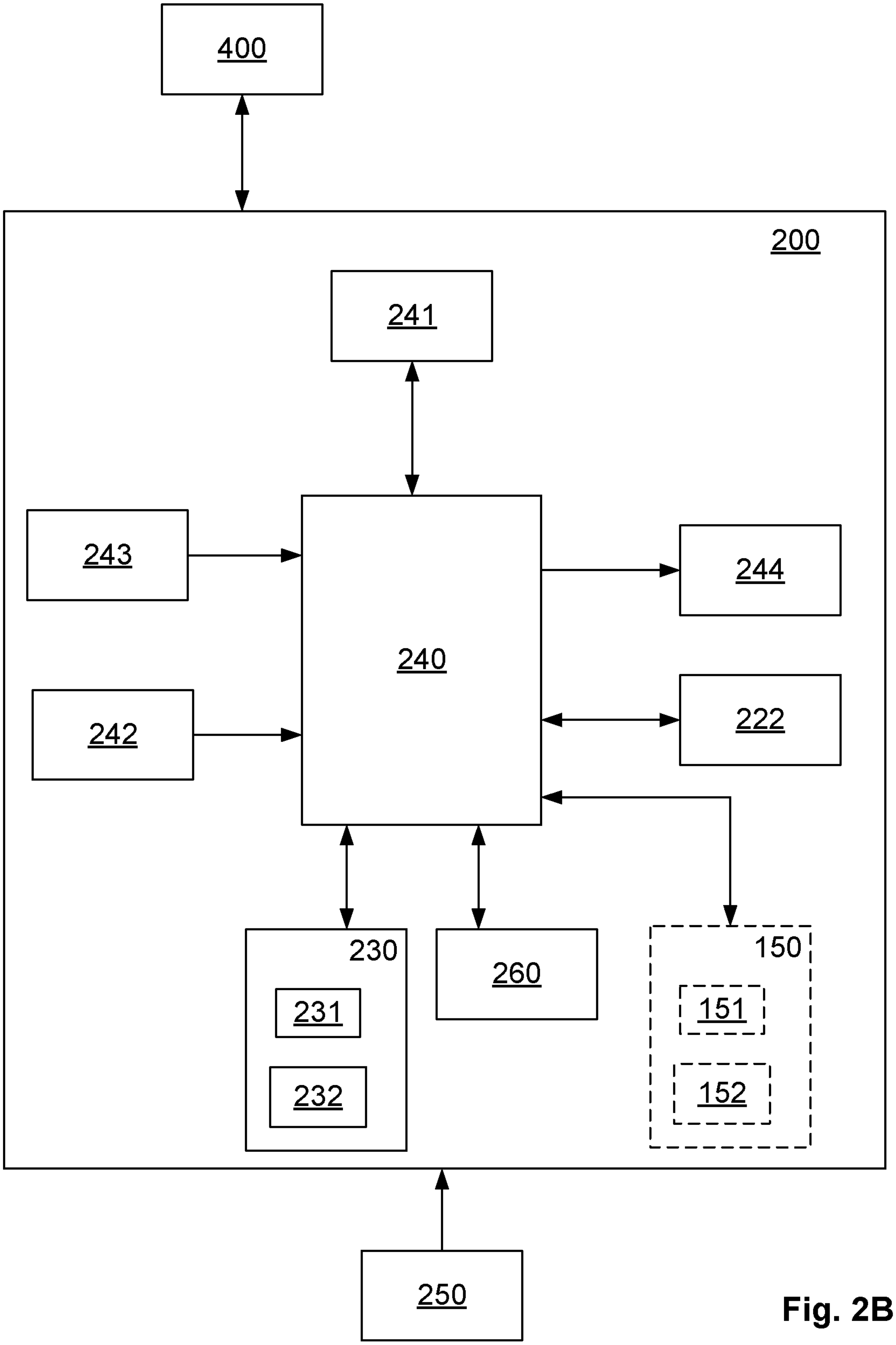
Figure 2C:
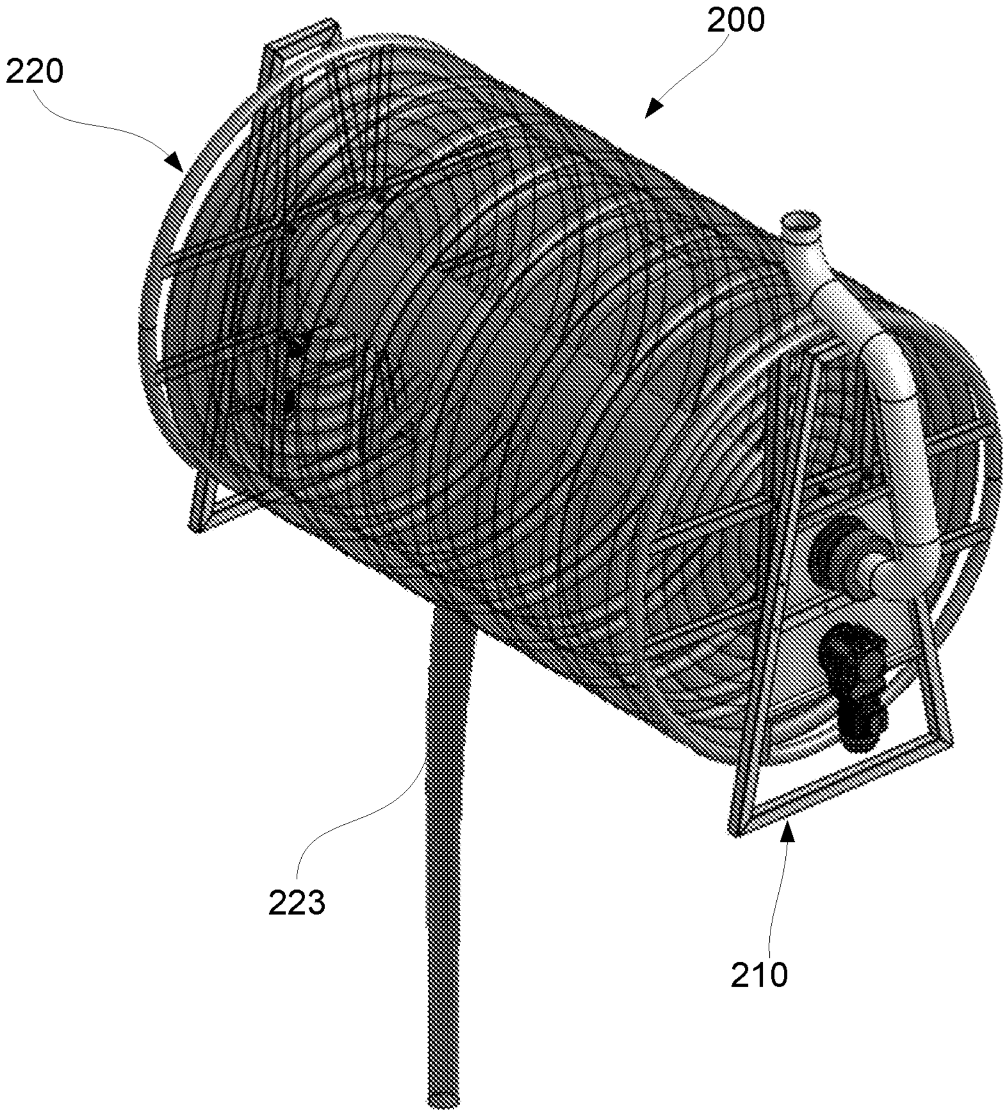

The fire extinguisher unit 200 further comprises at least one motorized hose reel 220 arranged horizontally, as shown in FIGS. 1 and 2A, or vertically, as shown in FIG. 2C, rotatably arranged to the support structure 210 by means of a vertically or horizontally extending rotation shaft 221, respectively, enabling the at least one hose reel 220 to rotate in relation to the support structure 210. The at least one motorized hose reel 220 can be a single reel or multireel. The at least one motorized hose reel 220 is arranged to at least one motor 222, e.g. hydraulically or electrically powered, enabling controlled rotation of the at least one hose reel 220. E.g. one may use toothed wheel, pinion gears, annular gear, planetary gear or similar to transfer the rotational movement between the at least one motor and the at least one hose reel 220. The MFFA 100 accordingly comprises at least one motorized hose reel 220 for accommodating a hose 223, such as a fire hose, that in a controlled manner can be reeled out or in, further described below. The hose 223 can be different types of hoses, dimensions, strengths and lengths, as well as a hose line assembled by multiple hose connected by suitable connections. The type and length of the hose can easily be changed from the hose reel 220. The hose 223 is, e.g., provided different colour codes that will show how much length is available.

The fire extinguisher unit 200 further comprises a controllable nozzle unit 230 connected to one a first end of the hose 223, wherein the controllable nozzle unit 230 comprises at least one controllable nozzle 231, wherein the controllable nozzle 231 is arranged to the support structure 210 via at least one controllable orientation unit 232 enabling control of vertical and horizontal position of the at least one controllable nozzle 231. The at least one controllable nozzle 231 is, e.g., controllable to control the water flow, jet velocity and shape of the water jet ejected therefrom. By means of the at least one orientation unit 232, the vertical and horizontal angles of the at least one controllable nozzle 231 are controllable. Examples of orientation units 232 are motorized movable platforms, motorized articulated joints, motorized rotational joints or interfaces, etc., units that enable movement of the attached at least one nozzle 231 in different degrees of freedom. Such solutions will be well known for a skilled person and requires no further detailed description herein. Accordingly, the at least one controllable nozzle 231 is configured for remote or autonomous control. In one embodiment, a swivel connection 233 is used for connection of the hose 223 allowing to the hose connection thereto to freely rotate in connection with reeling in or out the hose 223 from the at least one motorized hose reel 220.

In alternative embodiments of the controllable nozzle unit 230, two or more controllable nozzles 231 point in different directions, and/or are controllable in different directions, and/or are for redundancy.

The fire extinguisher unit 200 is further provided with a control unit 240 provided with a wireless communication device 241 enabling wireless communication with the fire extinguisher unit 200. Examples of wireless communication devices 241 applicable are, but not limited to, Global Positioning System (GPS), mobile network or direct WiFi connectivity.

The fire extinguisher unit 200 is further provided with at least one power source 250, such as one or more batteries or energy storages. In a further embodiment of the fire extinguisher unit 200, it further comprises energy harvesting means (not shown) for charging of the mentioned at least one power source 250. The energy harvesting means may e.g. be, but not limited to, solar panels, a generator (water) connected to the water flow (e.g. a diverted small part of the water flow), electromagnetic, piezoelectric, thermoelectric, MEMS. etc. Such energy harvesting means will be known for a skilled person and requires no further description herein.

In accordance with a further embodiment, the fire extinguisher unit 200 is provided with at least one sensor 242 to at least register or measure length of hose 223 that are reeled out from the hose reel 220 or present on the hose reel 220 at any time. In accordance with further embodiments, the fire extinguisher unit 200 is provided with at least one sensor to register or retrieve one or more of: status of the components 222, 230, 250, as well as sensors observing the surroundings, such as camera, thermal cameras, temperature sensors, etc. that may provide information about the surroundings and thus contribute in the fire suppressing operation.

In accordance with a further embodiment, the fire extinguisher unit 200 is provided with an inertial, motion or level sensor 243 reading the position of the fire extinguisher unit 200 that will inform if the fire extinguisher unit 200 is positioned safely on the ground and does not move. In accordance with a further embodiment of the fire extinguisher unit 200, one or more of the mentioned legs 211 are arranged to a manipulator 244 for adjustment of one or more of the legs 211 to level the fire extinguisher unit 200 in relation to the ground.

Accordingly, in the shown embodiment, the legs 211 will come out after the fire extinguisher unit 200 is on the ground and adjust itself to level regardless of the slope of the ground. This will ensure that the fire extinguisher unit 200 arranges the controllable nozzle unit 230 at level and prevents it from tipping over when the strength of the water comes.

In one embodiment, the mentioned control unit 240, by means and/or software, is configured to control:

- the operation of the at least one motorized hose reel 220 to reel in or out the hose 223 by controlling the at least one motor 222,
- the operation of the nozzle unit 230 by controlling start and stop of the water flow, water strength, water shape/stream, safety system, vertical and horizontal angles, etc.

The mentioned control unit 240 is configured to receive instructions from a dedicated or universal remote control unit 400 arranged in wireless communication therewith, such as, but not limited to, dedicated joystick device or smart devices, such as smartphones, tablets, computers, etc., provided with an appropriate application.

The dedicated or universal remote control unit 400 may be operated by a pilot of the aircraft or by other personnel supervising the operation.

By instructions from the dedicated or universal remote control unit 400, the control unit 240 controls the motorized hose reel 220 to reel out or reel in hose 223, as well as the speed of the reeling out or in. In this manner it is possible for the hose 223 to be reeled out or in of the at least one hose reel 220 in a controlled manner as the aircraft moves and thus also adapted the speed of the aircraft. In this manner one ensures a gentle deployment and retrieval of the hose 223 from/to the at least one hose reel 220.

When the fire extinguisher unit 200 is positioned at a desired fire-fighting location, the dedicated or universal remote control unit 400 can be used to give instructions to the control unit 240 to control the controllable nozzle unit 230 to eject water according to specifications (water flow, strength, shape), as well as controlling the at least one nozzle 360 degrees left and right, and pitch up and down directing the ejected water in a desired direction for fire-fighting or preventive work.

Accordingly, the control unit 240 is configured to manually control the controllable nozzle unit 230 remotely or automatically, by predefined control settings.

In accordance with a further embodiment of the control unit, the control unit 240 is configured, by comprising means and/or software, to perform machine learning and using artificial intelligence to adapt the settings of the controllable nozzle unit 230 according to the registrations of the at least one sensor 242, especially of sensors registering information about the surroundings.

The dedicated or universal remote control unit 400 is according to a further embodiment configured to show hose 223 lengths, how much is remaining in the hose reel 220 when reeling it out.

In accordance with a further embodiment, the fire extinguisher unit 200 is provided with an identifier or tracker to provide position and identification information so that the pilot of the aircraft may know which MFFA 100 that is below the aircraft, information that is displayed on the dedicated or universal remote control unit 400. In this manner a pilot will be able to able to pick up any MFFA 100 being position below an aircraft without any extra connectivity.

In accordance with a further embodiment, the MFFA 100 and dedicated or universal remote control unit 400 are further configured to automatically connect when in vicinity of each other.

The dedicated or universal remote control unit 400 is according to one embodiment provided with a power source and in addition may be provided with connection means for receiving power from the aircraft or other power supplying sources.

The dedicated or universal remote control unit 400 is according to one embodiment further provided with a user interface enabling desired controlling of the MFFA 100 and adjustment of the settings of the MFFA 100.

In accordance with a further embodiment of the fire extinguisher unit 200, it comprises safety system in the form of a hose release unit 260, such as a cutting device configured to cut the hose 223 if required, thus providing an emergency cutting device, if an emergency situation occurs, requiring the cutting of the hose 223 to release it from the aircraft. The hose release unit 260 is operated manually by the dedicated or universal remote control unit 400 or automatically operated if the at least one sensor 242 of the fire extinguisher unit 200 experience undesired situations. The mentioned hose release unit 260 will e.g. be arranged below or at lower part of the fire extinguisher unit 200.

The mentioned dedicated or universal remote control unit 400 may further be incorporated in the cockpit of the aircraft if desired.

The fire extinguisher unit 200 is further provided with a lifting assembly 500 enabling manual or automated connection of the MFFA 100 and fire extinguisher unit 200 to corresponding lifting system of an aircraft. In an automated embodiment, the lifting assembly 500 do not require any persons on ground to connect it to the aircraft. The lifting assembly 500 according to one embodiment comprises a connector 510 and at least one lifting member 520 arranged to the support structure 210 via at least one appropriate connection point 521 at one end, and to the connector 510 at the other end. The lifting assembly 500 may be arranged as a fixed part of the fire extinguisher unit 200 by that the lifting member(s) 520 is/are formed by rigid structure members, such as bars, poles or rods, or as a remote lifting assembly 500, where the lifting members 520 are formed by cables, chains, wires or similar allowing the connector 510 to be positioned on the ground in the vicinity of the MFFA 100 and fire extinguisher unit 200. The connector 510 is according to one embodiment provided with an engagement member 511 that a cargo hook system (not shown) suspended from the aircraft can engage and lock on to and unlock from in an automated and safe manner. The connector 510 may further be provided with a frustum-shaped guide body 512 below the engagement member 511 to facilitate the connection of the cargo hook system. Such cargo hook systems, are well known for a skilled person and requires no further description herein.

In accordance with a further embodiment of the fire extinguisher unit 200, the fire extinguisher unit 200 comprises protecting shields (not shown), plates, cover or similar, arranged to enclose and protect the moving parts of the fire extinguisher unit 200, such as the at least one motorized hose reel 220 and at least one motor 222 associated with the at least one motorized hose reel 220.

Figure 3A:
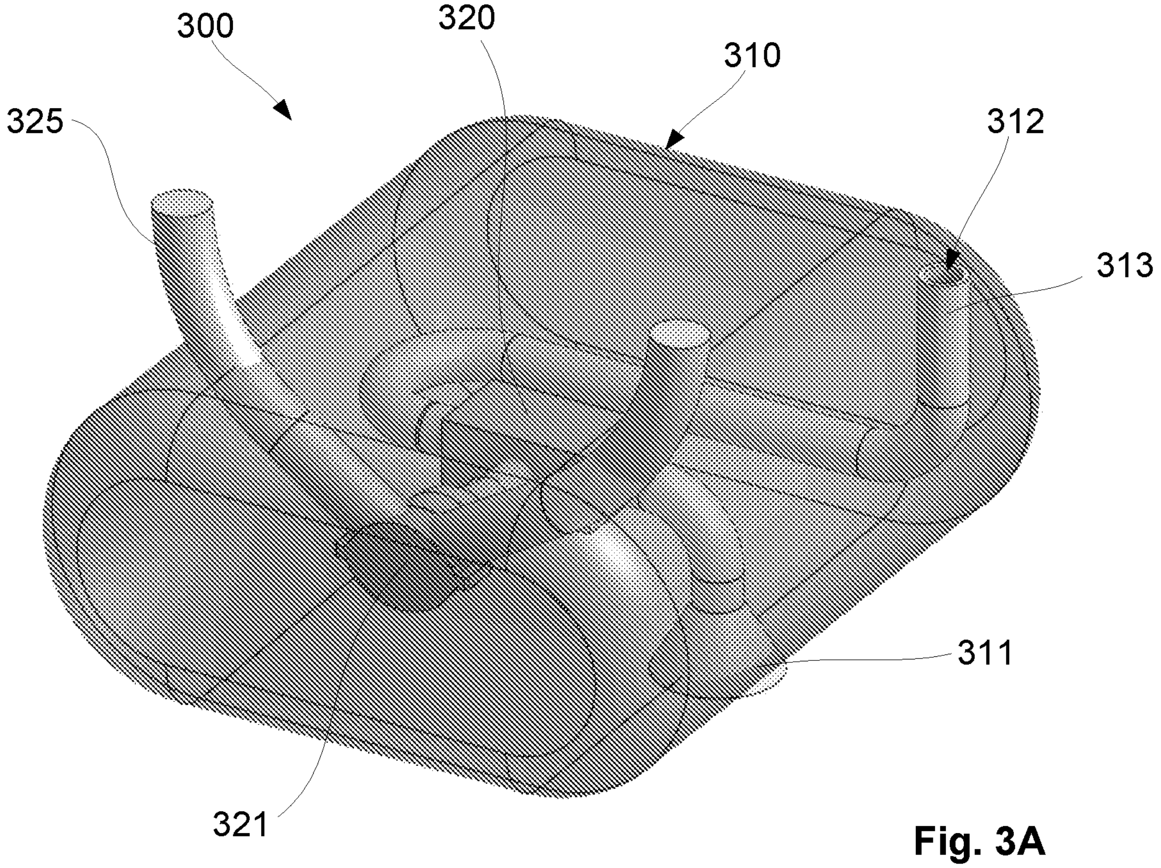
FIGS. 3A and 3B are principle drawings of a water supply unit of the mobile fire-fighting assembly in an embodiment.
Figure 3B:
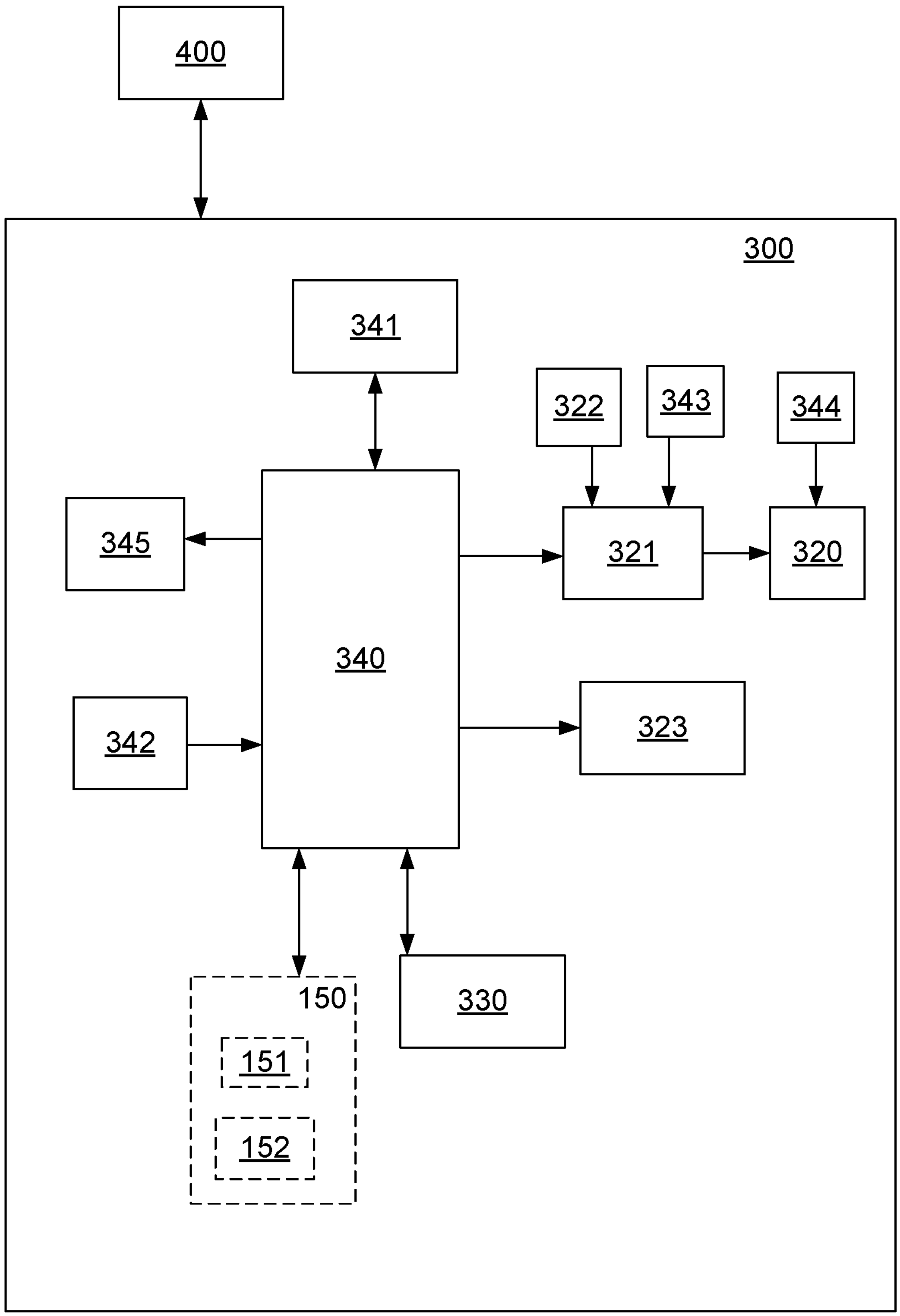

Reference is now made to FIGS. 3A and 3B showing principle drawings of the water supply unit 300 of the MFFA 100. The water supply unit 300 is according to one embodiment formed by a housing 310 configured with positive buoyancy to float in water.

The water supply unit 300 further comprises at least one water pump 320 driven by at least one controllable motor 321. The at least one water pump 320 is in fluid communication with a water inlet 311 e.g. arranged at lower part thereof and open to surrounding water, and a water outlet 312 provided with a connection 313 for connection to a second end of the hose 223 of the fire extinguisher unit 200. The at least one water pump 320 is configured to supply an even flow of water from a water source to the fire extinguisher unit 200 via the deployed hose 223, further described below. The at least one water pump 320 may be any type of pump capable of delivering the amount of water and capacity to pump water with required pressure to the fire extinguisher unit 200.

The at least one water pump motor 321 is e.g. a combustion motor, such as a turbine motor, diesel motor or a gasoline motor, or a hybrid or electrical motor. The at least one water pump motor 321 is arranged to an energy storage, for electric or hybrid motors, or a fuel tank 322 for combustion motors, wherein the energy storage and/or fuel tank 322 is accommodated in the housing 310. The fuel tank 322 is crash resistant and contain enough fuel, such as bio-fuel, Jet A1, diesel or gasoline, sufficient for long term operation, and in this manner allowing the water supply unit 300 to run through the whole night.

In accordance with one embodiment of the water supply unit 300, the housing 310 is provided with controllable ballast and/or buoyancy enabling control of the position of the water supply unit 300 in the water, as well as compensating for changes in fluid level in the fuel tank 322.

In a further embodiment of the water supply unit 300, the housing 310 has a fixed buoyancy or a combination of fixed and controllable ballast and/or buoyancy provided by ballast and/or buoyancy tanks 323.

In FIG. 3A is also shown exhaust pipes 325 for the embodiments including combustion motors 321. In addition, the housing 310 according to one embodiment is provided with airing pipes (not shown) for supplying air to or removing air from tanks 323 for adjustable buoyancy or ballast, and/or for cooling of the at least one motor 321.

In accordance with a further embodiment of the water supply unit 300, the water supply unit 300 is provided with an anti-drifting system 330, such as, but not limited to, one or more of: anchors, propulsion devices, water jets, etc., configured to maintain the water supply unit 300 in a determined position in a water source, thus preventing it from drifting.

In accordance with one embodiment of the water supply unit 300, the housing 310 encloses the other parts so that there will not be any danger for leakage to the environment in the event of failure or breakdown. In accordance with one embodiment, the housing 310 may be double-walled and/or be provided with at coating or layer sealing the surface of the housing 310 even in case of damages.

The water supply unit 300 is further provided with a control unit 340 provided with a wireless communication device 341 enabling wireless communication with the water supply unit 300. Examples of wireless communication devices 341 applicable are, but not limited to, Global Positioning System (GPS), mobile network or direct WiFi connectivity.

In accordance with a further embodiment, the water supply unit 300 is provided with at least one sensor 342 configured to register or retrieve one or more of: status of the components 320, 321, 322 (fuel level/energy storage level), 323 (fluid level in the tanks), as well as sensors observing the surroundings, such as camera, radar, lidar or other sensors that may detect if there are objects approaching the water supply unit 300 that may damage the water supply unit 300 or block the water inlet 311.

In accordance with one embodiment, the water supply unit 300 is further provided with a starter battery 343 for starting of the at least one motor 321.

According to a further embodiment, the at least one water pump 320 is provided with a self-priming system 344 configured to remove air from the system.

In accordance with one embodiment, the water supply unit 300 comprises a check valve (not shown) arranged upstream the at least one water pump 320 to avoid water from flowing back into the at least one water pump 320.

According to a further embodiment, the housing 310 of the water supply unit 300 is provided with one or more legs.

In accordance with one embodiment, the housing 310 is further provided with separate lifting means or adapted to be attached to lifting means enabling movement of the water supply unit 300 separately.

In accordance with a further embodiment, the water supply unit 300 comprises a drain valve 345 enabling drainage of the deployed hose 223 after use to enable reeling in the hose 223 again on the at least one motorized hose reel 220. In accordance with one embodiment, the drain valve 345 and check valve are combined as a three-way valve or valve assembly. The drain valve 345 is preferably a controllable valve that may be controlled by the control unit 340 after instructions from the dedicated or universal remote control unit 400.

The mentioned control unit 340 is configured to, by comprising means and/or software, to control the operation of the at least one water pump 320 and motor 321 to supply water to the fire extinguisher unit 200, as well as control the ballast/buoyancy tanks 323 and anti-drifting means 330, if present.

The mentioned control unit 340 is configured to receive instructions from a dedicated or universal remote control unit 400, hereunder also a dedicated remote control unit 400 integrated in an aircraft as discussed above, arranged in wireless communication therewith. A dedicate or universal remote control unit 400 is, e.g., a smart device, such as smartphones, tablets, computers, etc., provided with an appropriate application, as discussed above.

The dedicated or universal remote control unit 400 may be operated by a pilot of the aircraft or by other personnel supervising the operation.

By instructions from the dedicated or universal remote control unit 400, the control unit 340 controls the at least one water pump 320 and motor 321 to control the water amount and water pressure delivered to the fire extinguisher unit 200.

In accordance with a further embodiment, the water supply unit 300 comprises a safety system preventing fires from being started by the at least one motor 321.

Accordingly, the water supply unit 300 is designed to float on any type of water source. If shallow water, the water supply unit 300 will be able to stand in it, e.g. by being provided with legs or directly on the bottom. In an alternative embodiment, the water supply unit 300 is provided with an adjustable or remote water inlet 311 that may be adjusted according to the depth available at the water source.

If no water source is available, the water inlet 311 is further adapted for connection to an alternative or permanent available water sources, example fire hydrant, or other water supply unit 300, by means of hoses.

Accordingly, an MFFA 100 is provided that has crash resistant structure that will be able to handle forces in any direction.

Reference is again made to FIG. 1. The fire extinguisher unit 200 and water supply unit 300 is provided with a connection assembly 150 for detachably attachment to each other. In the shown embodiment the fire extinguisher unit 200 is adapted to receive and accommodate the water supply unit 300 under the support structure 210, i.e., between the legs 211. The fire extinguisher unit 200 and water supply unit 300 are provided with corresponding connection devices 151-152, arranged to the support structure 210 and housing 310, respectively, preferably at least at the distal longitudinal ends, at the longitudinal sides or both. At least one of the connection devices 151-152 comprises a controllable locking member not shown controllable into and out of engagement with a locking recess (not shown) in the other connection device 151-152. The mentioned controllable locking member of the connection devices 151-152 is controlled by the control unit 240 of the fire extinguisher unit 200 and/or control unit 340 of the water supply unit 300, based on instructions from the dedicated or universal remote control unit 400.

Accordingly, by means of the lifting assembly 500, the MFFA 100 can be handled by appropriate lifting means both for storage, deployment in the field and retrieval after ended operation or in case of failure. The lifting assembly 500 enables an aircraft to move the MFFA 100 as one unit and the fire extinguisher unit (200) as a separate unit.

The MFFA 100 can thus be picked up by an aircraft or other suitable transport craft or vehicle when a fire suppression operation is to be started and transported to a water source, such as a lake, river, well, pond, the ocean, or fire hydrant, in vicinity of a burning area/wildfire.

The MFFA 100 is picked up by an aircraft capable of doing hover flight with correct auto lock system, either at the storage location or after being transported to a position closer to the burning area/wildfire.

The aircraft then moves the MFFA 100 in a plain and efficient manner to remote areas were the mentioned water source is available. The MFFA 100 is then lowered into the water source or in vicinity of the water source, and the water supply unit 300 is released from the fire extinguisher unit 200 by releasing the connection assembly 150.

The aircraft then moves the fire extinguisher unit 200 in direction of a strategic location for fire suppressing at the same time as the hose 223 is reeled out in a controlled manner by controlling the at least one motor 222. When the fire extinguisher unit 200 reaches the desired location, the aircraft sets the fire extinguisher unit 200 on the ground and releases from the lifting assembly 500. The aircraft is thus free from the MFFA 100 and may fly away to do other work, such as, e.g., pick up another MFFA 100 for deployment or do other aerial work.

With the fire extinguisher unit 200 in place at the desired fire suppression location, the water supply unit 300 is started by means of a dedicated or universal remote control unit 400, such that water is supplied to the fire extinguisher unit 200, as well as starting the fire extinguisher unit 200 to perform active fire-fighting or preventive work in a manual or automated manner.

When the fire extinguisher unit 200 has completed its task in that location, the aircraft can come and pick it up by means of the lifting assembly 500, for example to move it to new location for continuing the fire-fighting or preventive work. If required, the hose 223 is reeled in or out of the hose reel 220 during also this movement.

If the fire suppression operation is over, the aircraft picks up the fire extinguisher unit 200 and transport it towards the water supply unit 300 or another suitable location at the same time as the hose 223 is controllably reeled in by means of controlling the at least one motor 222. The water supply unit 300 is in this stage stopped and the water drained from the hose 223.

The fire extinguisher unit 200 is next landed on the water supply unit 300, the connection assembly 150 is activated and the fire extinguisher unit 200 and water supply unit 300 are again one unit that can be moved to a suitable location for storage.

In an alternative approach, the fire extinguisher 200 is landed in a nearby location and the water supply unit 300 is retrieved later by an aircraft or by other suitable transport means.

In case of failure of the fire extinguisher unit 200 during a fire-fighting operation it can be picked up by the aircraft as described above and moved to a suitable location for repair or being exchanged with a new fire extinguisher unit 200.

The fire extinguisher unit 200 can also be temporary landed in a suitable location for extending the hose 223 by reeling up further hose connected to the already deployed hose 223 by suitable connection means. This accordingly requires that the same procedure is repeated when reeling in the hose 223 again, such that the extended length may be removed before reeling in the final lengths.

In accordance with a further embodiment, two or more water supply units 300 are arranged together, in series or parallel, by hose lines, for redundancy, to ensure sufficient water amount to be supplied or to extend the working area of the MFFA 100.

The disclosed embodiment thus provide a new and environmentally friendly way of fighting wildfires and a solution that will result in minimal footprint in the nature. Opposite prior art solutions, which often results in that equipment are left in the nature after a wildfire, the disclosed embodiments enable easy retrieval of the all the equipment after the operation has ended.

The disclosed embodiments further provide a solution that do not expose fire-fighting personnel to unnecessary risk due to the MFFA 100 can be operated remotely or automated.

The MFFA 100 further has the capability to be used in flooding incidents, where it instead of firing water on fires is installed to move water from one location to another.

The MFFA 100 further has the capability to be used in fighting drying of agricultural areas, where it instead of firing water on fires is installed to move water from water source to agricultural areas for saving the production.

The features of the above described embodiment may be modified and/or combined to form modified embodiments within the scope of the attached claims.

What is claimed is:

1. A mobile fire-fighting assembly (100) configured for movement with an aircraft, comprising:

a fire extinguisher unit (200) having a support structure (210), at least one motorized hose reel (220) accommodating a hose (223) and a controllable nozzle unit (230) arranged to a first end of the hose (223); and a water supply unit (300) having at least one water pump (320) connected to a second end of the hose (223), wherein the water supply unit (300) is configured to be detachably arranged to the support structure (210) thereby enabling (i) the fire extinguisher unit (200) and water supply unit (300) to be movable together as one unit when the water supply unit (300) is attached to the support structure (210), and (ii) the fire extinguisher unit (200) to be movable separate from the water supply unit (300) when the water supply unit (300) is detached from the support structure (210) and deployed at a water source, and the water supply unit (300) is configured to supply water to the fire extinguisher unit (200) when the water supply unit (300) is detached and separated from the support structure (210) and deployed at the water source remote from the fire extinguisher unit (200).

2. The mobile fire-fighting assembly (100) according to claim 1, wherein the at least one motorized hose reel (220) is arranged horizontally or vertically rotatable to the support structure (210) and arranged to at least one controllable motor (222) for controlled rotation thereof for reeling the hose (223) in or out.

3. The mobile fire-fighting assembly (100) according to claim 1, wherein the controllable nozzle unit (230) comprises at least one controllable nozzle (231) arranged to the support structure (210) via at least one controllable orientation unit (232) that enables control of vertical and horizontal position of the at least one nozzle (231).

4. The mobile fire-fighting assembly (100) according to claim 3, wherein the fire extinguisher unit (200) comprises a control unit (240) provided with a wireless communication device (241) that enables wireless communication with the fire extinguisher unit (200).

5. The mobile fire-fighting assembly (100) according to claim 1, wherein the fire extinguisher unit (200) comprises a control unit (240) provided with a wireless communication device (241) that enables wireless communication with the fire extinguisher unit (200).

6. The mobile fire-fighting assembly (100) according to claim 1, wherein the fire extinguisher unit (200) is provided with at least one sensor (242) to register or measure a length of the hose (223) that is reeled out from the at least one hose reel (220) or a length of the hose (223) present on the at least one hose reel (220) at any time.

7. The mobile fire-fighting assembly (100) according to claim 1, wherein the fire extinguisher unit (200) is provided with at least one sensor (242) observing the surroundings.

8. The mobile fire-fighting assembly (100) according to claim 1, wherein the fire extinguisher unit (200) is provided with legs (211) and at least one of the leg (211) is adjustable.

9. The mobile fire-fighting assembly (100) according to claim 1, wherein the fire extinguisher unit (200) comprises an inertial, motion or level sensor (243) reading the position of the fire extinguisher unit (200).

10. The mobile fire-fighting assembly (100) according to claim 1, wherein the fire extinguisher unit (200) comprises a lifting assembly (500) that enables an aircraft to move the mobile fire-fighting assembly (100) as one unit and to move the fire extinguisher unit (200) as a separate unit.

11. The mobile fire-fighting assembly (100) according to claim 2, wherein the fire extinguisher unit (200) comprises a lifting assembly (500) that enables an aircraft to move the mobile fire-fighting assembly (100) as one unit and to move the fire extinguisher unit (200) as a separate unit.

12. The mobile fire-fighting assembly (100) according to claim 5, wherein the fire extinguisher unit (200) comprises a lifting assembly (500) that enables an aircraft to move the mobile fire-fighting assembly (100) as one unit and to move the fire extinguisher unit (200) as a separate unit.

13. The mobile fire-fighting assembly (100) according to claim 12, wherein the fire extinguisher unit (200) comprises a control unit (240) that includes one or both of means and software configured to control the at least one motor (222) for controlling the at least one motorized hose reel (220) to reel the hose (223) in or out.

14. The mobile fire-fighting assembly (100) according to claim 2, wherein the fire extinguisher unit (200) comprises a control unit (240) that includes one or both of means and software configured to control the at least one motor (222) for controlling the at least one motorized hose reel (220) to reel the hose (223) in or out.

15. The mobile fire-fighting assembly (100) according to claim 1, wherein the water supply unit (300) comprises at least one controllable motor (321) driving the at least one water pump (320).

16. The mobile fire-fighting assembly (100) according to claim 15, wherein the water supply unit (300) further comprising one or both of an energy storage or fuel tank (322) arranged to the at least one motor (321).

17. The mobile fire-fighting assembly (100) according to claim 15, wherein the water supply unit (300) comprises a housing (310) with positive buoyancy configured to float in water and that accommodates the at least one water pump (320) and at least one motor (321).

18. The mobile fire-fighting assembly (100) according to claim 16, wherein the water supply unit (300) comprises a housing (310) with positive buoyancy configured to float in water and that accommodates the at least one water pump (320), at least one motor (321) and the one or both of the energy storage or fuel tank (322).

19. The mobile fire-fighting assembly (100) according to claim 1, wherein the water supply unit (300) is provided with an anti-drifting system (330) configured to maintain the water supply unit (300) in a determined position in a water source.

20. The mobile fire-fighting assembly (100) according to claim 1, wherein the water supply unit (300) is provided with a control unit (340) provided with a wireless communication device (341) that enables wireless communication with the water supply unit (300).

* * * * *